United States Patent
Bradley

(10) Patent No.: US 9,197,719 B2
(45) Date of Patent: Nov. 24, 2015

(54) METHOD FOR COMMUNICATING DATA BETWEEN A SYSTEM AND A MOBILE NETWORK THROUGH AN IP CHANNEL, CORRESPONDING PORTABLE OBJECT AND SYSTEM

(75) Inventor: Paul Bradley, Austin, TX (US)

(73) Assignee: GEMALTO SA, Meudon (FR)

( * ) Notice: Subject to any disclaimer, the term of this patent is extended or adjusted under 35 U.S.C. 154(b) by 379 days.

(21) Appl. No.: 13/201,388

(22) PCT Filed: Feb. 9, 2010

(86) PCT No.: PCT/EP2010/051588
§ 371 (c)(1),
(2), (4) Date: Sep. 29, 2011

(87) PCT Pub. No.: WO2010/092054
PCT Pub. Date: Aug. 19, 2010

(65) Prior Publication Data
US 2012/0034933 A1 Feb. 9, 2012

(30) Foreign Application Priority Data
Feb. 13, 2009 (EP) .................... 09152865

(51) Int. Cl.
 *H04L 29/08* (2006.01)
 *H04W 12/06* (2009.01)
 *H04W 76/02* (2009.01)
(52) U.S. Cl.
 CPC ............ *H04L 67/34* (2013.01); *H04L 67/04* (2013.01); *H04L 67/18* (2013.01); *H04W 12/06* (2013.01); *H04W 76/022* (2013.01)
(58) Field of Classification Search
 CPC ............ G06Q 20/341; G06Q 20/3278; G06Q 20/352; G06Q 20/3574; G07F 7/1008; H04W 12/06; H04W 48/18; H04W 8/12; H04W 8/183; H04W 4/02; G06F 21/78; H04L 63/0853
 See application file for complete search history.

(56) References Cited

U.S. PATENT DOCUMENTS

| 6,138,009 A | 10/2000 | Birgerson |
| 2005/0059385 A1 | 3/2005 | Twigg et al. |

(Continued)

FOREIGN PATENT DOCUMENTS

| EP | 1 672 899 A1 | 6/2006 |
| EP | 1 912 453 A2 | 4/2008 |

(Continued)

OTHER PUBLICATIONS
International Search Report (PCT/ISA/210) issued on Mar. 22, 2010, by European Patent Office as the International Searching Authority for International Application No. PCT/EP2010/051588.

*Primary Examiner* — Jung Park
(74) *Attorney, Agent, or Firm* — Buchanan Ingersoll & Rooney PC

(57) ABSTRACT

The invention relates to a method for communicating data between a communication system and a mobile radio-communication network through an Internet Protocol data communication channel. The communication system comprises a host device and a portable object cooperating with the host device. According to the invention, the portable object determines in which geographical place the communication system is located. The portable object determines whether at least one subscription before a mobile radio-communication network operator over a data communication channel using the IP within the geographical place exists or not. And, if at least one subscription before a mobile radio network operator exists, then the portable object sends to the host device a request for reading configuration data relating to an access to the data communication channel using the IP. The invention relates also to corresponding portable object and communication system comprising a host device and the portable object cooperating with the host device.

10 Claims, 1 Drawing Sheet

(56) References Cited

U.S. PATENT DOCUMENTS

| | | | |
|---|---|---|---|
| 2007/0129078 A1* | 6/2007 | De Beer | 455/445 |
| 2007/0155400 A1 | 7/2007 | Madsen | |
| 2007/0253251 A1* | 11/2007 | Mizushima et al. | 365/185.04 |
| 2008/0090568 A1 | 4/2008 | Venkateswarlu | |
| 2008/0268866 A1 | 10/2008 | Sukkarie | |
| 2008/0288585 A1* | 11/2008 | Choi et al. | 709/203 |
| 2009/0011745 A1* | 1/2009 | Cha | 455/414.1 |
| 2009/0029682 A1* | 1/2009 | Filho et al. | 455/412.2 |
| 2010/0004003 A1* | 1/2010 | Duggal et al. | 455/456.3 |

FOREIGN PATENT DOCUMENTS

| | | |
|---|---|---|
| WO | WO 98/58506 A1 | 12/1998 |
| WO | WO 00/18156 A1 | 3/2000 |
| WO | WO 2008/128337 A1 | 10/2008 |

\* cited by examiner

METHOD FOR COMMUNICATING DATA BETWEEN A SYSTEM AND A MOBILE NETWORK THROUGH AN IP CHANNEL, CORRESPONDING PORTABLE OBJECT AND SYSTEM

FIELD OF THE INVENTION

The invention relates, in a general manner, to a method for communicating data between a communication system and a mobile radio-communication network through an Internet Protocol (or IP) data communication channel.

Moreover, the invention relates to a portable object for communicating data between a communication system and a mobile radio-communication network through an IP data communication channel.

Within the present description, a portable object is a portable smart object that is intended to communicate with the outside world, and, in particular, to cooperate with a host device.

Finally, the invention relates to a communication system comprising a host device and a portable object cooperating with the host device.

The present invention is notably applicable within a mobile radio-communication field wherein a smart card termed Subscribed Identity Module (or SIM) card or the like, as portable object, is coupled with a mobile telephone, as host device.

STATE OF THE ART

As known per se, a mobile telephone uses a circuit switched model for conveying data relating notably to voice and/or Short Message Service (or SMS) through a mobile radio-communication network.

However, such a solution for conveying data is not efficient.

There is thus a need to provide a solution allowing to offer a data convey that is more efficient than with the circuit switched model.

SUMMARY OF THE INVENTION

The invention proposes a solution for satisfying the just hereinabove specified need by providing a method for communicating data between a communication system and a mobile radio-communication network through an IP data communication channel. The communication system comprises a host device and a portable object cooperating with the host device.

According to the invention, firstly, the portable object determines in which geographical place the communication system is located. Then, the portable object determines whether at least one subscription before a mobile radio-communication network operator over a data communication channel using the IP within the geographical place exists or not. And, if at least one subscription before a mobile radio network operator exists, then the portable object sends to the host device a request for reading configuration data relating to an access to the data communication channel using the IP.

The principle of the invention consists in that the portable object decides, when, where it is, one connection to the mobile radio-communication network through an IP data channel is available, to launch a configuration of the host device, so as to communicate data through the IP data channel.

Advantageously, the host device reads the configuration data and configures the communication so that the host device communicates data over the IP data channel with the mobile radio-communication channel.

Contrary to the hereinabove described known solution, the invention solution allows to convey data, not through a circuit switched model, but through an IP data channel with a greater debit rate than the one offered by the circuit switched model, to address the mobile radio-communication network.

When applicable, i.e. notably as soon as an IP data channel may be used, the invention solution allows to possibly dynamically switch from a circuit switched model to an IP data channel while using another subscription.

Within the present existing infrastructure, the invention solution allows to better use capacities of the mobile radio-communication network by automatically provisioning, via the IP data channel, data relating notably to voice and/or SMS. Thus, the use of the IP data channel is maximised.

As one example, currently, a so-termed Mobile Virtual Network Operator (or MVNO) buys a right for using, at least in part, a mobile radio-communication network belonging to a physical Mobile Network Operator (or MNO) (that operates the mobile radio-communication network) to convey a certain quantity of data. Accordingly, a MVNO subscriber may benefit, thanks to a registered corresponding MVNO subscription, from the IP data channel (generally at a reduced price compared to the corresponding price of a MNO), instead of a subscription that only allows to benefit from a circuit switched model to carry data.

It is to be noted that a man skilled in the art could not have considered to use an IP data channel to convey data relating notably to voice and/or SMS. As a matter of fact, as known per se, as its name indicates, the IP data channel is dedicated to convey data relating to IP, and not to any other kind of data, like data relating to voice and/or SMS traffic.

According to a further aspect, the invention is a portable object for communicating data between a communication system and a mobile radio-communication network through an IP data communication channel. The portable object is intended to cooperate with a host device. The communication system comprises the portable object and the host device.

According to the invention, the portable object is adapted to determine, on the one hand, in which geographical place the communication system is located and, on the other hand, whether at least one subscription before a mobile radio-communication network operator over a data communication channel using the IP within the geographical place exists or not. And, if at least one subscription before a mobile radio network operator exists, then the portable object is further adapted to send to the host device a request for reading configuration data relating to an access to the data communication channel using the IP.

According to a still further aspect, the invention is a communication system for communicating data with a mobile radio-communication network through an IP data communication channel. The communication system comprises a host device and a portable object cooperating with the host device.

According to the invention, the portable object is adapted to determine, on the one hand, in which geographical place the communication system is located and, on the other hand, whether at least one subscription before a mobile radio-communication network operator over a data communication channel using the IP within the geographical place exists or not. And, if at least one subscription before a mobile radio network operator exists, then the portable object is further adapted to send to the host device a request for reading configuration data relating to an access to the data communication channel using the IP.

By using the invention portable object, a corresponding communication system is thus capable to use, either statically or dynamically, i.e. when changing from geographical location, such as region and/or country, an IP data channel to exchange data with a mobile radio-communication network.

BRIEF DESCRIPTION OF THE DRAWINGS

Additional features and advantages of the invention will be more clearly understandable after reading a detailed description of one preferred embodiment of the invention, given as an indicative and non-limitative example, in conjunction with the following drawings.

DETAILED DESCRIPTION

Herein under is considered a case in which the invention portable object is a SIM type smart card intended to be coupled to a mobile telephone, as a host device.

For example, instead of being constituted by a SIM type smart card, the portable object can be constituted by a dongle (that does not need any specific reader within a host computer), a USB smart card, and/or any other electronic medium that may have different form factors. According to still other examples, the portable object can also be a chip fixed, possibly in a removable manner, to a host device, or an embedded Secure Element, as a chip to be soldered within a host device.

Likewise, instead of being constituted by a mobile phone, the host device can be constituted, for example, by a set-up box, a desktop computer, a laptop computer, a media-player, a game console, a handset and/or a Personal Digital Assistance (or PDA).

Naturally, the herein below described embodiment is only for exemplifying purposes and is not considered to reduce the scope of the present invention.

Figure 1:
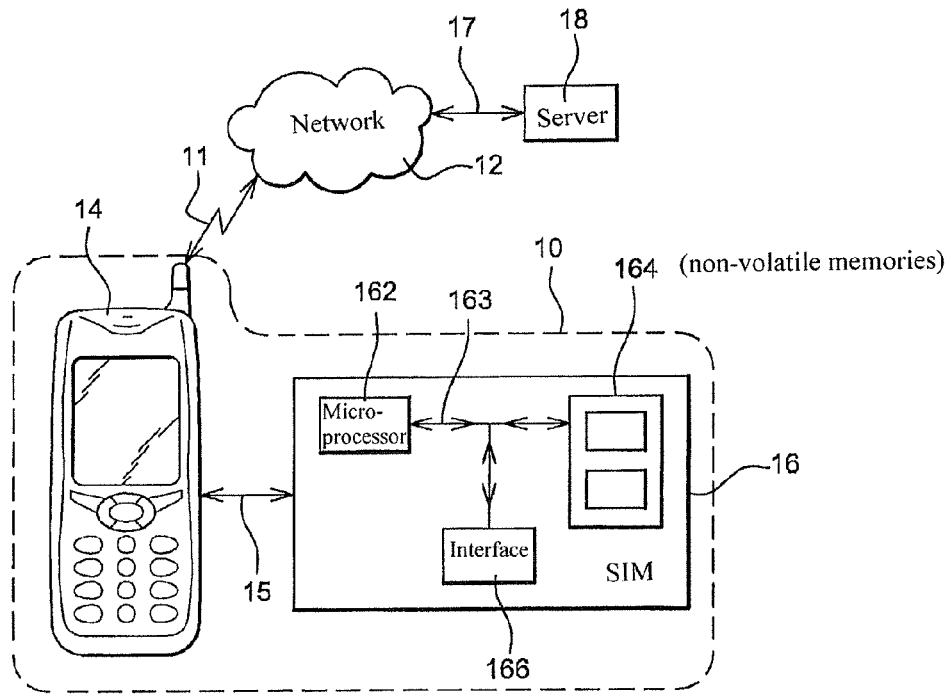
FIG. 1 illustrates a simplified diagram of one embodiment of a communication system comprising a SIM type smart card, as portable object, and a mobile telephone, as host device, the communication system being adapted, according to its geographical location, to communicate data over an IP data channel with a mobile radio-communication network.

FIG. 1 schematically shows a mobile communication assembly 10 that is already or to be connected to a mobile radio-communication network 12.

The mobile radio-communication network 12 may be a GSM (acronym for "Global System for Mobile communications"), UTRAN (acronym for "UMTS Terrestrial Radio Access Network"), EDGE (acronym for "Enhanced Data Rates for GSM Evolution"), GPRS (acronym for "General Packet Radio System"), UMTS (acronym for "Universal Mobile Telecommunication System"), WLAN (acronym for "Wide Local Area Network") and/or CDMA (acronym for Code Division Multiple Access) network(s).

As known per se, the GPRS is a packet oriented Mobile Data Service available to users of 2G & 3G GSM mobile radio-communication networks.

The mobile radio-communication network 12 comprises, as a network element(s), a Short Message Service Center (or SMSC) that manages SMS messages within the mobile radio-communication network 12, and/or a Gateway GPRS Support Node (or GGSN).

As known per se, the GGSN is an anchor point that enables a mobility of the phone 14 within a GPRS/UMTS network(s), as mobile radio-communication network 12. The GGSN provides an IP address to the phone 14 during the time period of the connection.

The mobile radio-communication network 12 is optionally linked through a bi-directional wired line 17 to a server 18, as an Over-The-Air (or OTA) platform. The server 18 is operated by a mobile network operator, such as a MNO.

The mobile communication assembly 10, as a communication system, includes a mobile telephone 14, as a hand-held appliance, and a SIM type smart card 16.

For a sake of clarity and conciseness, the mobile telephone 14 and the SIM type smart card 16 are termed hereinafter the phone 14 and the card 16 respectively.

The phone 14 can be connected, on the one hand, to the mobile radio-communication network 12, through at least one IP data communication channel 11, or termed IP data channel 11, and on the other hand, to the card 16.

The card 16 can be, for example, a SIM smart card for a GSM network, a Universal Subscriber Identity Module (or USIM) for a UMTS network, a Removable User Identity Module (or RUIM), a CDMA Subscriber Identity module (or CSIM) for a CDMA network, and/or an Internet Protocol multimedia Services Identity Module (or ISIM) for IP Multimedia Subsystem (or IMS).

As known per se, the card 16 is a device that has computing means with limited performance with respect to the one relating to a Personal Computer (or PC), or to the phone 14. The card 16 is intended to interact with the phone 14, in order to connect the mobile radio-communication network 12.

Functional components incorporated within a chip included within the card 16 are also shown within FIG. 1.

The card chip comprises at least one microprocessor 162, as data processing means, volatile and non volatile memories 164, and at least one Input/Output (I/O) interface 166 linked all together through a data and control internal bus 163.

The microprocessor 162 controls and communicates with all the components of the card chip, such as the memories 164 to read them and possibly write into them. The microprocessor 162 controls a data exchange, through the I/O interface 166, with outside, notably the phone 14.

The memories 164 can be constituted by one or several EEPROM (acronym for "Electrically Erasable Programmable Read-Only Memory"), one or several ROM (acronym for "Read Only Memory"), one or several Flash memories, and/or any other memories of different types, like one or several RAM (acronym for "Random Access Memory").

The I/O interface 166 is used to receive data from or send data to outside, namely with at least the phone 14, as host device, through a corresponding phone I/O interface, via a bi-directional communication link 15.

According to one particular embodiment, the I/O interface 166 comprises at least one Application Protocol Data Unit (or APDU) communication channel.

The I/O interface 166 may comprise another or other communication channel(s), such as an Internet Protocol (or IP) communication channel, a Mass Storage communication channel, and/or a Universal Serial Bus (or USB) communication channel in compliance with the USB standard specifications.

According to the invention, the card chip is arranged to determine in which location it is, and, according to the determined location, retrieve one corresponding subscription taken before a mobile radio-communication network operator that operates the mobile radio-communication network 12 via an IP data channel 11. When a corresponding subscription is retrieved, the card chip is further arranged to request the phone 14 to read configuration data relating to an access to the IP data channel 11.

To do this, the microprocessor 162 executes notably an application, such as a Java applet, that the card 16 supports, i.e. stored within the chip memories 164. The application checks in which country the card user is presently located. And, when a subscription for using the IP data channel 11 to exchange data with the mobile radio-communication network 12 exists, then the card 16 asks the phone 14 to read corresponding configuration data, in order to either dynamically (during travelling, i.e. when changing from geographical place) switch from a currently used data communication channel (distinct from the IP data channel 11) to the IP data channel 11 or statically (i.e. at a phone power on) connect the mobile radio-communication network 12 through the IP data channel 11. Thus, the phone 14 transmits voice and/or SMS traffic data through the IP data channel 11 instead of a circuit switched model or any other data communication channel that is distinct from the IP data channel 11.

It is to be noted that a subscription for using the IP data channel 11 encompasses at least one corresponding identifier of a communication service subscriber before the mobile radio-communication network 12, namely an International Mobile Subscriber Identity (or IMSI) value, and an associated Access Point Name (or APN) that identifies an external network that is accessible from a mobile terminal, such as the phone 14.

According to a preferred embodiment, the card chip memories 164 securely store, for each of at least one geographical place, such as a region and/or a country, configuration data items that allow to configure a connection from the phone 14 so as to use the IP data channel 11. Only the card owner, as card user, has the rights to access the associated configuration data items. More exactly, the configuration data items are freed and used only when the card user has been authenticated by the card 16, i.e. the card 16 has verified that data given as a Personal Identity Number (or PIN) by the card user matches the PIN stored within the card memories 164.

According to another embodiment, instead of being stored within the card 16, the configuration data items, for each of at least one geographical place, are stored within another entity, such as a remote server (not represented), the address of which is provided by the card 16 to the phone 14. The phone 14 is able to access the other entity thanks to access data supplied by the card 16.

The configuration data may comprise at least some associated items of the following data:

an identifier of a geographical place, such as a Mobile Country Code (or MCC), one IMSI, as a unique number identifying a communication service subscriber, a service subscriber key Ki, an access point name, a user name, a password, and/or a home page.

Naturally, the data item list that is given is not exhaustive and may comprise other configuration item(s) that is(are) not listed.

For example, for a given country, namely United kingdom, a table given herein below indicates a value for each of the announced configuration data item.

| Data field (one entry per country) | Example Value |
|---|---|
| Mobile Country code | 234 (United Kingdom) |
| IMSI | 23420123456789 |
| Ki (this field is blank when K and Opc are filled) | 00000000000000000000000000000000 |
| K (this field is blank when Ki is filled) | 12A7C67D12A7C67D12A7C67D12A7C67D |
| OPc (this field is blank when Ki is filled) | 2A7C67D12A7C67D12A7C67D12A7C67D1 |
| Milenage constants | 00000000000000000000000000000000 |
|  | 00000000000000000000000000000001 |
|  | 00000000000000000000000000000002 |
|  | 00000000000000000000000000000004 |
|  | 00000000000000000000000000000008 |
|  | 4000204060 |
| Access Point Name | Internet |
| Username | Web |
| Password | Web |
| Homepage | http://wap.XXXXX.co.uk |

Where:

a MCC value identifies a country in which the IP data channel 11 is present;

an IMSI value identifies a unique user of the communication service offered through the IP data channel 11 with the mobile radio-communication network 12. The IMSI value is used to identify one subscriber to benefit from a data communication service through the IP data channel 11 offered through the mobile communication network 12 by a MNO or a MVNO;

a Ki value authenticates the card user to benefit from the communication service offered through the IP data channel 11 with the mobile radio-communication network 12, when the mobile radio-communication network 12 consists of a 2G system, namely a second generation system. The service subscriber authentication key ki is freed and used only when the phone user has been authenticated by the card 16;

a K value authenticates the card user to benefit from the communication service offered through the IP data channel 11 with the mobile radio-communication network 12, when the mobile radio-communication network 12 consists of a 3G network, namely a third generation network;

an OPc value is used for an authentication to log on the 3G network;

Milenage constants are used for an authentication to log on the 3G network;

an Access Point Name value is used to identify a GPRS bearer service within the GSM or UMTS mobile radio-communication network 12. The APN defines the service type that is provided within the packet data connection;

a username is a connection parameter that defines an individual username of the concerned subscriber. The username may be used by an operator to control access to a GPRS or 3G data bearer service within the GSM or UMTS mobile radio-communication network 12;

a password is a parameter used by an operator to control access to a GPRS or 3G data bearer service within the GSM or UMTS mobile radio-communication network 12. The password may be used to validate the username, when present;

a home page is a parameter that is used to provide a Uniform Resource Locator (or URL) to a MNO or MVNO default mobile portal. The MNO or MVNO default mobile portal may be used by the subscriber to access services provided by the MNO or MVNO. In the given example, the data represented by "XXXXX" may be a name of the MNO or MVNO that offers the communication service via the IP data channel 11 to the mobile radio-communication network 12.

The card 16 forces, preferably at an initiative of the card 16, the phone 14, as its host, to therefore use the IP data channel 11 for exchanging, in particular, voice and/or SMS data through a service given by a MNO or a MVNO.

The card 16 allows to align the data settings of her or his phone 14 to the subscription providing a communication service through an IP data channel 11 rather than through another data channel, such as a circuit switched model.

The bit rates via an IP data channel 11 is higher than via a circuit switched channel. For example, within GSM, the bit rate through a circuit switched channel is around some kilobits per second (or kb/s) and the bit rate through an IP data channel with GPRS technology is around 170 kb/s. The bit rate through an IP data channel with 3G technology reaches between around 2 Mb/s and 14.4 Mb/s when the phone 14 does not change from a base station to another base station or 384 kb/s when the phone 14 changes from a base station to another one.

It is considered that a communication of data through an IP data channel 11 is at less expensive rates than notably through a classical circuit switched model. For example, a data amount of 60 kbits to be communicated is considered to transfer one minute of data relating to voice. At today's data bit rates, it is much cheaper to use voice over the IP data channel 11 with a 3G network, as a high speed data network, than to use voice over a circuit switched model.

When applicable, namely for the given example when the card user is in UK, the card 16 supplies the phone 14 with configuration data that configures the phone 14 to connect through a corresponding access point name, the IP data channel 11, to communicate any data to be sent, such as voice, SMS, and/or Internet traffic data.

Any call and/or exchange of SMS data is blocked through any other data communication channel, such as a circuit switched model.

Such an automatic configuration may be used for all calls or a part of selected calls, possibly except calls to emergency numbers.

A table with configuration data relating to several regions and/or countries can be advantageously used so as to respect some roaming rules that are dependent on the different authorised mobile radio-communication networks (and corresponding MNO(s) and/or MVNO(s)), including the current one 12, the card user is allowed to use when she or he travels so as to exchange data through corresponding IP data channels. A plurality of dedicated IMSI values, associated authentication key values, and associated APN values are then used, namely one relating to a region and/or country from which the card user originates and at least another one relating to a region and/or country to which the card user travels.

Optionally, a card user may activate and/or deactivate such an automatic configuration for using an IP data channel 11 to communicate voice and/or SMS traffic data to the mobile radio-communication network 12 available in the present occupied place.

Optionally, the card 16 may be programmed so that the card 16 periodically checks an availability of an IP data channel 11 by analysing its location. When the card 16 detects that the card user changes region and/or country, e.g. crossing from France to UK, the subscription is then changed to the one supplying a data communication service through the IP data channel 11. In such a roaming context, the card 16 requests again, i.e. a first request has occurred within the home country, and a second request occurs within the UK, as the visited region and/or country, to read again the new data settings, namely the ones relating to the visited region and/or country. The card 16 provisions again, from the card table or database, data settings to the phone 14. The subscription is changed, namely at least another IMSI value, another authentication key and another access point name are used to transfer data via the IP data channel 11.

Figure 2:
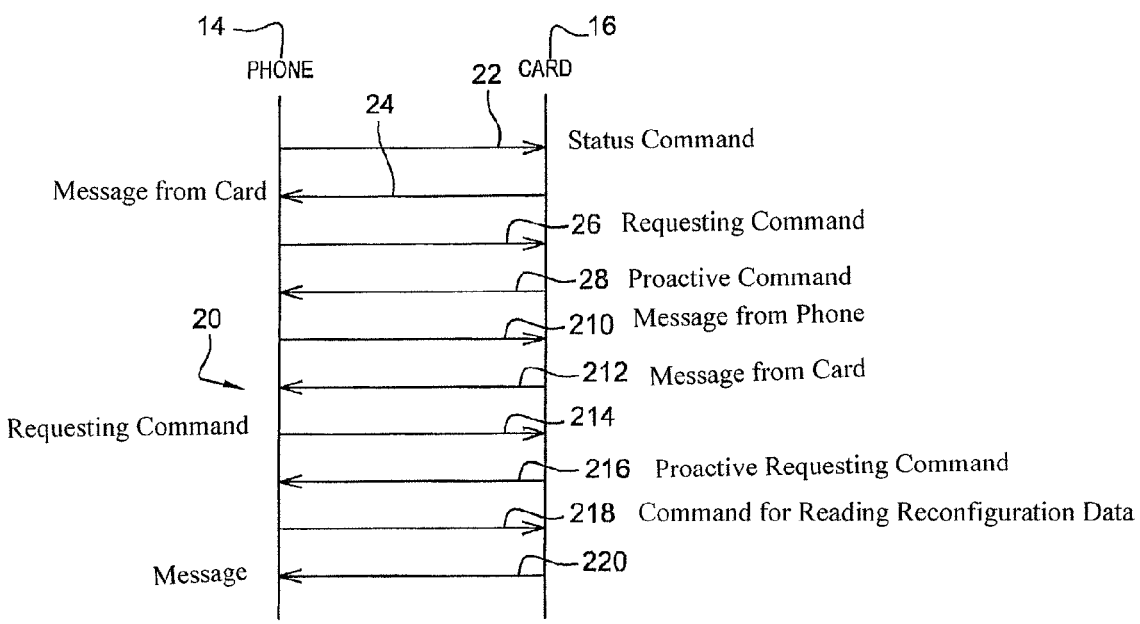
FIG. 2 represents an example of one message flow notably between the mobile telephone and the SIM type smart card within the communication system of FIG. 1, so as to use an IP data communication channel to convey data.

Herein below is described, in relation with FIG. 2, one example of a set 20 of messages exchanged between the card 16 and the phone 14, so as to connect the IP data channel 11 to transfer data.

It is assumed that the card user with the phone 14 is situated within the UK territory and the card user switches on the phone 14. Moreover, for the described example, the card 16 stores the configuration data relating to access the IP data channel 11 available on the UK territory.

During a configuration phase (not represented), the card 16 provides the phone 14 with a so-termed "set-up event list", by which the card 16 announces that, for each indicated event that occurs, the phone 14 has to inform the card 16. Within the event list, the card 16 requests the phone 14 to be informed notably about the occurrence of the event relating to information about the detection of its occupied geographical place.

Firstly, the phone 14 sends to the card 16 a status command 22 for indicating that the phone 14 has detected the current location of the phone 14.

According to another example (not described herein after), instead of being a static condition for triggering the automatic configuration of a connection to the IP data channel 11, namely the current location place of the phone 14, each time the card 16 detects that the phone 14 enters the UK territory, the phone 14 sends to the card 16 a corresponding message for informing that the phone 14 changes from geographical place. According to such an example, a condition for triggering the automatic configuration of a connection to the IP data channel 11 is a dynamic one, since the phone 14 originates from a country territory and comes to another country territory. The card 16 may also store the configuration data relating to the country from which the phone 14 originates. In such a case, the phone 14 may, further to a similar exchange of messages as explained infra, switch from a circuit switched model used within the originating country to an IP data channel 11 to communicate with the mobile radio-communication network 12 to be used within the entering country.

Once the card 16 receives information relating to a detection of the geographical place that is occupied by the phone 14, the card 16 sends to the phone 14 a message 24 for indicating that the card 16 has a pending command, also termed a proactive command, to send to the phone 14. The message 24 for indicating that the card 16 has the proactive command that is waiting for being sent to the phone 14, as host, is indicated via a status word, such as 91XX, that also states the length of data waiting to be sought with two digits in hexadecimal with "XX".

As known per se, a proactive capacity allows to revert the traditional master-slave mechanism so as to execute Application Protocol Data Units (or APDU) applications. To do this, the phone 14 regularly polls the card 16 by sending it a dummy command, so as to know whether the card 16 has or not to issue a proactive command to be executed by the phone 14.

Such a proactive capability of the card 16 is specified within some standard specifications, such as the European Telecommunication Standard Institute (or ETSI) Technical Specifications (or TS) 102 223 version 8.2.0 (2009-01), and known therein as the Card Application Toolkit (or CAT). The CAT enables APDU applications offered by the card 16.

As soon as the phone 14 is aware that the card 16 has a pending proactive command to be executed and the phone 14 is available to deal with it, the phone 14 sends to the card 16 a command 26 for requesting the card 16, such as "FETCH", to issue the waiting proactive command the data length of which is XX.

Then, the card 16 sends back to the phone 14 the waiting proactive command 28 for requesting from the phone 14 to provide information relating to a current local geographical location of the phone 14.

Once the phone 14 has received and interpreted the proactive command, the phone 14 returns to the card 16 a message 210, such as "TERMINAL RESPONSE", for providing the card 16 with information relating to the current local geographical location.

As known per se, to do this, an element of the mobile radio-communication network 12 indicates to the phone 14 a local geographical location within the mobile radio-communication network 12 from which the phone 14 and/or the card 16 is able to deduce the country in which the phone 14 is situated. Alternatively, the phone 14 determines itself its local geographical location for example with an embedded so-termed Global Positioning System (or GPS).

When the card 16 has received the current local geographical location and deduced the country in which the phone 14 is, the card 16 detects or deduces that the phone 14 is presently within the UK territory.

Then, the card 16 looks up within the stored table of the configuration data whether one or several subscriptions before a MNO and/or MVNO exist to convey data via the IP data channel 11 to the mobile radio-communication network 12. Thanks to the configuration data needed to access one available IP data channel 11, the card 16 detects and retrieves that one subscription before a MVNO is available.

Since the card 16 finds one subscription before a MVNO that is available to access the IP data channel 11 in order to transfer data, the card 16 sends to the phone 14 a message 212 for indicating that the card 16 has a proactive command, to send to the phone 14. The message 212 for indicating that the card 16 has the proactive command that is waiting for being issued to the phone 14, is indicated via a status word, such as 91XX, that also states the length of data waiting to be sought with two digits in hexadecimal with "XX".

As soon as the phone 14 is aware that the card 16 has a pending proactive command to be executed and the phone 14 is available to deal with it, the phone 14 sends to the card 16 a command 214 for requesting the card 16, such as "FETCH", to issue the waiting proactive command the data length of which is XX.

In response, the card 16 sends to the phone 14 a proactive command 216 for requesting the phone 14 to read configuration data relating to an access to the IP data channel 11.

Once the phone 14 has received and interpreted the proactive command 216, the phone 14 executes the proactive command by sending back a command 218 for reading configuration data relating to an access to the IP data channel 11.

Then, the card 16 retrieves the configuration data, among which there are the IMSI value, the authentication key value(s) and the APN value, to be used.

Once the card 16 has retrieved the needed configuration data, the card 16 sends to the phone 14 a message 220 encompassing configuration data relating to an access to the IP data channel 11.

When the phone 14 has collected the needed configuration data, the phone 14 connects to the mobile radio-communication network 12 by using the IP data channel 11 to transfer data relating to voice and/or SMS traffic.

The proposed solution is automatically and securely triggered by the card 16.

The proposed solution provides a seamless user experience, i.e. transparent for the card user provided that the card user is present in a place at which an IP data channel 11 is accessible and for which she or has paid some using rights. As using rights, the card user owns a corresponding subscription associated with at least one IMSI value, one associated authentication key value and one associated APN to access the IP data channel, that are preferentially stored within the card 16.

According to another embodiment, when not stored within the card 16, the corresponding subscription is retrieved by the phone 14 with information provided by the card 16 so as to collect the configuration data needed to access the IP data channel 11. To do this, the phone 14 sends, possibly through a circuit switched model data communication channel, to another entity, such a remote server, as a network element included within the mobile radio-communication network 12 and operated by a MNO and/or a MVNO, a command for reading configuration data relating to an access to the IP data channel 11. Then, the other entity sends back to the phone 14 the requested configuration data.

The invention claimed is:

1. A method for communicating data between a communication system and a mobile radio-communication network through an Internet Protocol (IP) data communication channel, the communication system comprising a host device and a portable object cooperating with the host device,
    wherein the method comprises the following steps:
        determining, by the portable object, a geographical place in which the communication system is located;
        determining, by the portable object, based on the geographical place, whether at least one subscription does or does not exist before the mobile radio-communication network operator for using the IP data communication channel to exchange data with the mobile radio-communication network; and
        if at least one subscription before the mobile radio network operator exists for using the IP data communication channel, (i) sending by the portable object, to the host device a request for reading configuration data relating to an access to the IP data communication channel, said configuration data including an Access Point Name (APN) for connecting the host device through the APN to the IP data communication channel, and (ii) launching, by the portable object, a configuration of the host device to connect through the APN to the IP data communication channel in order to communicate data with the mobile radio-communication network via the IP data communication channel.

2. The method according to claim 1, wherein the host device communicates data, based on the read configuration data, over the IP data communication channel with the mobile radio-communication network.

3. The method according to claim 2, wherein, before a data communication of the host device with the mobile radio-communication network, the host device sends to the portable object a command for reading configuration data relating to an access to the IP data communication channel, and the portable object sends back to the host device the requested configuration data relating to an access to the IP data communication channel.

4. The method according to claim 2, wherein, before a data communication of the host device with the mobile radio-communication network, the host device sends to a network element comprised within the mobile radio-communication network a command for reading configuration data relating to an access to the IP data communication channel using, and the network element sends back to the host device the requested configuration data relating to an access to the IP data communication channel using.

5. The method according to claim 1, wherein the step in which the portable object determines the geographical place in which the communication system is located comprises the following steps:
   sending, by the portable object, to the host device, a command for requesting the geographical place in which the communication system is located;
   receiving, by the portable object, from the host device, a response comprising the geographical place in which the communication system is located.

6. The method according to claim 1, wherein, before the step in which the portable object sends to the host device a request for reading configuration data relating to an access to the IP data communication channel, the portable object further determines whether the geographical place has changed.

7. The method according to claim 1, wherein the configuration data further includes at least one element belonging to a group comprising:
   a subscriber identifier for using the mobile radio-communication network; and
   an authentication key for authorizing the subscriber to use the mobile radio-communication network.

8. The method according to claim 1, wherein the data to be communicated between a communication system and a mobile radio-communication network through the IP data communication channel comprises at least one of voice data and SMS data.

9. A portable object for communicating data between a communication system and a mobile radio-communication network through an Internet Protocol (IP) data communication channel, the portable object being configured to cooperate with a host device, the communication system comprising the portable object and the host device,
wherein the portable object is configured to:
   determine a geographical place in which the communication system is located;
   determine, based on the geographical place, whether at least one subscription exists before the mobile radio-communication network operator for using the IP communication channel to exchange data with the mobile radio-communication network;
   send, if at least one subscription before the mobile radio network operator exists for using the IP communication channel, to the host device, a request for reading configuration data relating to an access to the IP data communication channel, said configuration data including an Access Point Name (APN) for connecting the host device through the APN to the IP data communication channel, and
   launch a configuration of the host device to connect through the APN to the IP data communication channel in order to communicate data with the mobile radio-communication network via the IP data communication channel.

10. A communication system for communicating data with a mobile radio-communication network through an Internet Protocol (IP) data communication channel, the communication system comprising a host device and a portable object cooperating with the host device,
wherein the portable object is configured to:
   determine a geographical place in which the communication system is located;
   determine, based on the geographical place, whether at least one subscription exists before the mobile radio-communication network operator for using the IP communication channel to exchange data with the mobile radio-communication network; and
   send, if at least one subscription before the mobile radio network operator exists for using the IP communication channel, to the host device, a request for reading configuration data relating to an access to the IP data communication channel, said configuration data including an Access Point Name (APN) for connecting the host device through the APN to the IP data communication channel, and
   launch a configuration of the host device to connect through the APN to the IP data communication channel in order to communicate data with the mobile radio-communication network via the IP data communication channel.

* * * * *